United States Patent Office 3,130,009
Patented Apr. 21, 1964

3,130,009
METHOD FOR PREPARING TETRA-
HYDROXYDIBORON
Robert J. Brotherton, Fullerton, Calif., assignor to United
States Borax & Chemical Corporation, Los Angeles,
Calif., a corporation of Nevada
No Drawing. Filed Sept. 21, 1959, Ser. No. 841,019
1 Claim. (Cl. 23—149)

This invention relates as indicated to a method for the preparation of tetrahydroxydiboron.

Tetrahydroxydiboron has in the past been produced by the hydrolysis of diboron tetrachloride. While on the surface this would appear to be a relatively simple method for obtaining tetrahydroxydiboron, in all actuality the process is extremely costly due to the difficulty of obtaining the starting material, diboron tetrachloride.

Tetrahydroxydiboron has properties similar to those of boric acid and will be found to have substantially the same uses as boric acid. Tetrahydroxydiboron will be found to have an affinity for various metallic and basic oxides and has utility in the preparation of fluxes, special porcelain enamels and glass compositions. It is also useful in the manufacture of metallic borates, borides and other special compounds such as ferro-boron and boron-addition alloys. Further tetrahydroxydiboron will be found to have utility as a catalyst in the conversion and synthesis of many organic compounds. Still further, tetrahydroxydiboron has the additional characteristic of being a reducing agent, and most important of all tetrahydroxydiboron is, by simple heating, readily converted to boron monoxide; a cheap source of which has long been desired by those skilled in the art of boron chemistry.

It is therefore the principal object of this invention to provide a new and economically desirable method for the preparation of tetrahydroxydiboron.

Other objects will appear as the description proceeds.

To the accomplishment of the foregoing and related ends, the invention then comprises the features hereinafter fully described and pointed out in the claims, the following description setting forth in detail certain illustrative embodiments of the invention, these being indicative, however, of but a few ways in which the principle of the invention may be employed.

Broadly stated, the present invention comprises the method of producig tetrahydroxydiboron which comprises reacting a material selected from the class consisting of tetraalkylaminodiborons derived from primary and secondary amines, said alkyl groups having from 1-6 carbon atoms and tetraarylaminodiborons derived from primary and secondary amines, said aryl groups selected from the class consisting of benzene, methyl substituted benzenes and naphthalene with an acid selected from the class consisting of hydrochloric, hydrobromic, hydriodic, sulfuric, sulfurous, phosphoric, pyrophosphoric, oxalic, picric, methylsulfonic, benzene sulfonic, trichloroacetic and trifluoroacetic in the presence of water, said water present in at least stoichiometric amounts.

The invention described in the foregoing broadly stated paragraph can be illustrated by the following general equation:

$$B_2(NR_2)_4 + 4HX + 4H_2O \rightarrow B_2(OH)_4 + 4R_2NH \cdot HX$$

where $B_2(NR_2)_4$ is the aminodiboron and HX is the acid as defined in the above broadly stated paragraph.

In the foregoing broadly stated paragraph, it is to be understood that the acid reactant can be used in stoichiometric amounts or can be used in appropriate stoichiometric amounts. I have found that exact molar ratios between the acid reactant and the amino reactant do not have to be maintained. The presence of a slight excess or insufficiency of the acid reactant is not detrimental to the present process.

Since tetrahydroxydiboron is relatively insoluble in water and the amine hydrochlorides formed during the reaction are substantially soluble in water, the desired end product can be readily and cheaply separated from the reaction mass as by simple filtration. Thus in view of the water solubility of the amine hydrochlorides, in the preferred embodiment of my invention I use water in excess of the stoichiometric requirements; the excess being in amounts sufficient to insure solution of the amine hydrochlorides formed during the reaction.

Referring to the tetraalkylaminodiborons and tetraarylaminodiborons as noted above, they are derived from primary and secondary amines and the alkyl groups have from 1-6 carbon atoms and the aryl groups are selected from benzene, methyl substituted benzenes and naphthalene. The following list is illustrative of such materials applicable as reactants in the present process:

Tetra(methylamino)diboron
Tetra(dimethylamino)diboron
Tetra(ethylamino)diboron
Tetra(diethylamino)diboron
Tetra(isopropylamino)diboron
Tetra(diisopropylamino)diboron
Tetra(n-hexylamino)diboron
Tetra(di-n-hexylamino)diboron
Tetra(anilino)diboron
Tetra(p-toluidino)diboron
Tetra(1-naphthylamino)diboron
Tetra(diphenylamino)diboron So that the present invention can be more clearly understood, the following examples are given:

(I) A solution of 28.5 ml. of 6.19 N hydrochloric acid was slowly added to a mixture comprising 8.40 grams of tetra(dimethylamino)diboron in 10.0 ml. of water at about 0° C. The resultant solid was filtered and dried to give 2.89 grams of crude tetrahydroxydiboron. This crude material was then washed with 10 ml. of 0.068 N hydrochloric acid, the residue was dried to give 2.14 grams (56.3% yield) of white tetrahydroxydiboron.

Analysis.—Calculated for $H_4O_4B_2$: B, 24.20%. Found: B, 24.00%.

(II) Example I was repeated using the equivalent amount of HBr instead of the HCl. The results were substantially the same as noted in Example I.

(III) Example I was repeated using an equivalent amount of tetra(n-hexylamino)diboron instead of the tetra(dimethylamino)diboron. The reaction resulted in a 65.4% yield of tetrahydroxydiboron having a boron analysis of 24.13%.

(IV) Example I was repeated using an equivalent amount of tetra(diphenylamino)diboron instead of the tetra(dimethylamino)diboron. The results were substantially the same as noted in Example I.

The foregoing examples only illustrate the use of hydrochloric and hydrobromic acids. It would be unnecessarily repetitious to give examples using the other acids since they work substantially the same and are equally applicable to the invention.

Additionally it will be clearly understood that any of the foregoing defined aminodiborons are equally applicable to the invention as those given in the above examples.

Other modes of applying the principle of the invention may be employed provided the features stated in the following claim or the equivalent of such be employed.

I, therefore, particularly point out and distinctly claim as my invention:

The method of producing tetrahydroxydiboron which comprises reacting a material selected from the class consisting of tetraalkylaminodiborons derived from primary and secondary amines, said alkyl groups having from 1–6 carbon atoms and tetraarylaminodiborons derived from primary and secondary amines, said aryl groups selected from the class consisting of benzene, methyl substituted benzene and naphthalene, with hydrochloric acid in the presence of water, said water present in excess of the stoichiometric requirements in an amount sufficient to dissolve the amine hydrochloride formed during said reaction, and separating tetrahydroxydiboron from the reaction mass.

References Cited in the file of this patent

Schechter et al.: "Boron Hydrides and Related Compounds," prepared under Contract $NO_2(s)$ 10992 for Dept. of Navy, Bureau of Aeronautics, prepared by Callery Chemical Co., printed March 1951, declassified December 1953, page 95.

Wiberg et al.: "Berichte," vol. 70, No. 6, pp. 1393–1402 (1937).

UNITED STATES PATENT OFFICE
CERTIFICATE OF CORRECTION

Patent No. 3,130,009                        April 21, 1964

Robert J. Brotherton

It is hereby certified that error appears in the above numbered patent requiring correction and that the said Letters Patent should read as corrected below.

Column 1, line 47, for "producig" read -- producing --; line 69, for "appropriate" read -- approximate --.

Signed and sealed this 11th day of August 1964.

(SEAL)
Attest:

ERNEST W. SWIDER
Attesting Officer

EDWARD J. BRENNER
Commissioner of Patents